(12) United States Patent
Tomatsu et al.

(10) Patent No.: US 10,366,473 B2
(45) Date of Patent: Jul. 30, 2019

(54) PROVIDING TRAFFIC MIRROR CONTENT TO A DRIVER

(71) Applicant: TOYOTA JIDOSHA KABUSHIKI KAISHA, Toyota-shi, Aichi-ken (JP)

(72) Inventors: Nobuyuki Tomatsu, Toyota (JP); Siyuan Dai, Mountain View, CA (US); Yusuke Kashiba, Toyota (JP); Shinichi Shiraishi, Mountain View, CA (US)

( * ) Notice: Subject to any disclaimer, the term of this patent is extended or adjusted under 35 U.S.C. 154(b) by 109 days.

(21) Appl. No.: 15/603,086

(22) Filed: May 23, 2017

(65) Prior Publication Data

US 2018/0342046 A1 Nov. 29, 2018

(51) Int. Cl.
| G06T 3/60 | (2006.01) |
| G01S 19/14 | (2010.01) |
| G02B 27/01 | (2006.01) |
| G06T 19/00 | (2011.01) |
| H04N 7/18 | (2006.01) |

(52) U.S. Cl.
CPC ............... *G06T 3/60* (2013.01); *G01S 19/14* (2013.01); *G02B 27/0101* (2013.01); *G06T 19/006* (2013.01); *H04N 7/183* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 8,379,043 B1 * | 2/2013 | Paige ..................... G06F 3/147 345/204 |
| 2015/0015712 A1 | 1/2015 | Sempuku |
| 2016/0342850 A1 * | 11/2016 | Elimalech ............. G08G 1/161 |
| 2017/0210289 A1 * | 7/2017 | Dhawan .................. B60Q 9/00 |
| 2018/0096535 A1 * | 4/2018 | Schwartz ............ G02B 27/017 |
| 2018/0172453 A1 * | 6/2018 | Weinfield .............. G01C 21/28 |

FOREIGN PATENT DOCUMENTS

| JP | H07-215092 A | 8/1995 |
| JP | H09-035177 A | 2/1997 |
| JP | 2005-136561 A | 5/2005 |
| JP | 2005-178623 A | 7/2005 |
| JP | 2007-102691 | * 4/2007 |
| JP | 2013-054496 A | 3/2013 |
| WO | WO 2013/118191 A1 | 8/2013 |

* cited by examiner

*Primary Examiner* — Eileen M Adams
(74) *Attorney, Agent, or Firm* — Burbage Law, P.C.; Jon-Michael Burbage; Elizabeth Ruzich

(57) ABSTRACT

The disclosure includes embodiments for assisting a driver of a vehicle to view traffic mirror content. A method according to some embodiments includes retrieving global positioning system (GPS) data that describes a current location of a vehicle. The method includes generating mirror data based on the GPS data, wherein the mirror data identifies a fixed location of a traffic mirror included in a roadway environment. The method includes instructing, based on the mirror data, an external sensor associated with the vehicle to capture captured image data that describes an image of the traffic mirror. The method includes generating processed image data that describes an optically reversed version of the image. The method includes instructing a display device to display the optically reversed version of the image.

20 Claims, 8 Drawing Sheets

PROVIDING TRAFFIC MIRROR CONTENT TO A DRIVER

BACKGROUND

The specification relates to a driver assistance system for providing traffic mirror content to a driver of a vehicle.

Traffic mirrors are unsafe and hard for drivers to see and understand. For example, traffic mirrors are unsafe because drivers have to look up from the roads they are driving on and scan the horizon with their eyes to locate and see the traffic mirrors, which makes viewing traffic mirrors unsafe. Traffic mirrors are hard to see because the image reflected by the traffic mirror itself is small, which makes the image difficult to see. Traffic mirrors are hard to understand because the objects in the image are optically reversed.

SUMMARY

Existing solutions to the problem of using traffic mirrors focus on replacing traffic mirrors installed within a roadway environment with high-definition cameras that include special sensors and communication capabilities that enable them to communicate with vehicles (herein "traffic cameras"). These traffic cameras then communicate with vehicles using vehicle to infrastructure (V2I) techniques to stream images captured by the cameras to the vehicles. The drivers of these vehicles can then see the images captured by these traffic cameras on an electronic display of their vehicle.

The existing solutions are problematic because they are very expensive and complex to implement. First, thousands of traffic mirrors have to be removed and thrown away. This process is expensive and wasteful since the traffic mirrors work well for their intended purpose. Second, thousands of high-definition cameras with V2I communication capabilities have to be purchased at great expense. Third, the process of installing the high-definition cameras is also expensive and time consuming. Fourth, the newly-installed cameras will be a constant source of additional expense because they require electricity and routine maintenance by skilled electricians, who are more expensive to employ than regular roadway maintenance workers. By comparison, traffic mirrors do not require any electricity and their maintenance is limited to regular cleaning, which can be done by unskilled roadway maintenance workers who are not expensive to employ. Fifth, because the newly-installed traffic cameras will use a particular communication protocol, technology across the country will need to be updated to include a communication modules that will enable them to communicate with the traffic cameras using the particular communication protocol.

Described herein is a driver assistance system operable to provide traffic mirror content to a driver of a vehicle. The driver assistance system is advantageous because it may be software that is installed in an onboard computer of a vehicle that does not require any new hardware to be installed in the vehicle.

The driver assistance system helps drivers to be able to safely see and understand the images that are reflected by traffic mirrors. In this way the driver assistance system helps drivers to know when it is safe to turn left or right because they will have a better understanding of areas of the roadway that they are unable to see with their un-aided eyes.

The driver assistance system may retrieve a global positioning system (hereinafter "GPS") data that describes a current location of the vehicle. The GPS data may be received from a dedicated short range communication (herein "DSRC") compliant GPS unit that is accurate within plus or minus three meters. The driver assistance system may generate mirror data based on the GPS data. For example, map data may describe the location of traffic mirrors for a geographic area. The driver assistance system may use the GPS data to identify the corresponding location of the traffic mirror in proximity to the vehicle from the map data.

The driver assistance system may instruct, based on the mirror data, an external camera associated with the vehicle to capture captured image data that describes an image of the traffic mirror. For example, the driver assistance system may instruct the external camera to adjust in a way that corresponds to the location of the traffic mirror to capture an image that includes the traffic mirror.

The driver assistance system generates processed image data that describes an optically reversed version of the image. The processed image data may also describe one or more of an enlarged version of the optically reversed version of the image and a non-distorted version of the optically reversed version of the image.

The driver assistance system may instruct a display device to display the optically reversed version of the image. The display device may include augmented reality goggles (herein "AR goggles") and instructing the AR goggles to display the optically reversed version of the image may include providing the processed image data to the AR goggles, receiving head position data describing a position of a head of a driver of the vehicle, generating a graphical overlay, and instructing the AR goggles to display the graphical overlay. The display device may also include a three-dimensional heads-up display (herein "3D-HUD") or a full-color electronic display, such as a display associated with an infotainment system.

The driver assistance system described herein may provide numerous benefits to improve the performance of a vehicle and the safety of a driver. First, the driver assistance system avoids the need to remove traffic mirrors and replace them with expensive cameras that require maintenance from expensive professionals. Second, the driver assistance system may use the current vehicle hardware and does not require additional hardware to work. Third, the driver assistance system provides a safer experience for the driver because the driver assistance system displays processed image data that includes an optically reversed version of objects from a traffic mirror. Fourth, the driver assistance system provides a more pleasant experience for the driver because the driver can see the traffic mirror content on a display device instead of having to look up from the road and determine what is being displayed in a traffic mirror.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

One general aspect includes a method comprising retrieving GPS data that describes a current location of a vehicle; generating mirror data based on the GPS data, wherein the mirror data identifies a fixed location of a traffic mirror included in a roadway environment; instructing, based on the mirror data, an external sensor associated with the vehicle to capture captured image data that describes an image of the traffic mirror; generating processed image data that describes an optically reversed version of the image; and instructing a display device to display the optically reversed version of the image.

Implementations may include one or more of the following features. The method where the display device comprises augmented reality goggles and instructing the display device to display the optically reversed version of the image includes providing the processed image data to the augmented reality goggles, receiving head position data describing a position of a head of a driver of the vehicle, responsive to determining, based on the head position data, to display a graphical overlay depicting the optically reversed version of the image, generating the graphical overlay, instructing the augmented reality goggles to display the graphical overlay, and instructing the augmented reality goggles to periodically display an update for the graphical overlay. The method includes where responsive to determining to display the graphical overlay is further based on a determination that the driver is looking at the fixed location in a real world where the traffic mirror would be located. The method includes where instructing the display device to display the optically reversed version of the image occurs responsive to a determination based on analyzing vehicle data that the vehicle is stationary. The method further comprises determining an intention of a driver of the vehicle to turn in a particular direction, estimating whether it is safe for the driver to turn in the particular direction, and where instructing the display device to display the optically reversed version of the image includes instructing the display device to provide a recommendation for whether it is safe for the driver to turn in the particular direction. The method includes where the display device comprises a 3D-HUD and instructing the display device to display the optically reversed version of the image includes displaying the optically reversed version of the image on the 3D HUD. The method includes where the processed image data further describes an enlarged version of the optically reversed version of the image and a non-distorted version of the optically reversed version of the image. The method includes where instructing the external sensor to capture the image of the traffic mirror based on the mirror data further includes: receiving captured image data from the external camera, comparing the captured image data to object priors, and identifying the traffic mirror based on comparing the captured image data to object priors. The method includes where the display device comprises a full-color electronic display. The method further includes that the GPS data is received from a DSRC-complaint GPS unit that is part of the vehicle. The method where generating the mirror data based on the GPS data includes: receiving map data that describes corresponding locations for a set of traffic mirrors in a geographic location and identifying the fixed location of the traffic mirror by comparing the current location of the vehicle to the map data.

One general aspect includes a system comprising: an onboard vehicle computer system including a non-transitory memory storing computer code which, when executed by the onboard vehicle computer system causes the onboard vehicle computer system to: retrieve GPS data that describes a current location of a vehicle, generate mirror data based on the GPS data, wherein the mirror data identifies a fixed location of a traffic mirror included in a roadway environment, instruct, based on the mirror data, an external sensor associated with the vehicle to capture captured image data that describes an image of the traffic mirror, generate processed image data that describes an optically reversed version of the image, and instruct a display device to display the optically reversed version of the image by providing the processed image data to the display device. The system may also include the display device coupled to the onboard vehicle computer system, the display viewing device operable to receive the processed image data and display the optically reversed version of the image.

Implementations may include one or more of the following features. The display device comprises augmented reality goggles and the onboard vehicle computer system includes additional code which, when executed by the onboard vehicle computer system causes the onboard vehicle computer system to: provide the processed image data to the augmented reality goggles, receive head position data describing a position of a head of a driver of the vehicle, responsive to determining, based on the head position data, to display a graphical overlay depicting the optically reversed version of the image, generate the graphical overlay, instruct the augmented reality goggles to display the graphical overlay, and instruct the augmented reality goggles to periodically display an update for the graphical overlay. The system includes where responsive to determining to display the graphical overlay, is further based on a determination that the driver is looking at the fixed location in a real world where the traffic mirror would be located.

One general aspect includes computer program product comprising a non-transitory memory of an onboard vehicle computer system of a vehicle storing computer-executable code that, when executed by the onboard vehicle computer system, causes the onboard vehicle computer system to: retrieve GPS data that describes a current location of a vehicle, generate mirror data based on the GPS data, wherein the mirror data identifies a fixed location of a traffic mirror included in a roadway environment, instruct, based on the mirror data, an external sensor associated with the vehicle to capture captured image data that describes an image of the traffic mirror, generate processed image data that describes an optically reversed version of the image, and instruct a display device to display the optically reversed version of the image.

Implementations may include one or more of the following features. The computer program product includes that the display device comprises augmented reality goggles and the computer-executable code causes the onboard vehicle computer system to: provide the processed image data to the augmented reality goggles, receive head position data describing a position of a head of a driver of the vehicle, responsive to determining, based on the head position data, to display a graphical overlay depicting the optically reversed version of the image, generate the graphical overlay, instruct the augmented reality goggles to display the graphical overlay, and instruct the augmented reality goggles to periodically display an update for the graphical overlay. The computer program product includes, where responsive to determining to display the graphical overlay is further based on a determination that the driver is looking at the fixed location in a real world where the traffic mirror would be located. The computer program further includes where instructing the display device to display the optically reversed version of the image occurs responsive to a determination based on analyzing vehicle data that the vehicle is stationary. The computer program further includes the computer-executable code causes the onboard vehicle computer system to: determine an intention of a driver of the vehicle to turn in a particular direction, estimate whether it is safe for the driver to turn in the particular direction, and wherein instructing the display device to display the optically reversed version of the image includes instructing the display device to provide a recommendation for whether it is safe for the driver to turn in the particular direction. The computer program further includes where the display device comprises a 3D-HUD and instructing the display device to display the optically reversed version of the image includes displaying the optically reversed version of the image on the 3D HUD.

Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Described herein are embodiments of a driver assistance system included in a vehicle.

Example Operating Environment

Figure 1:
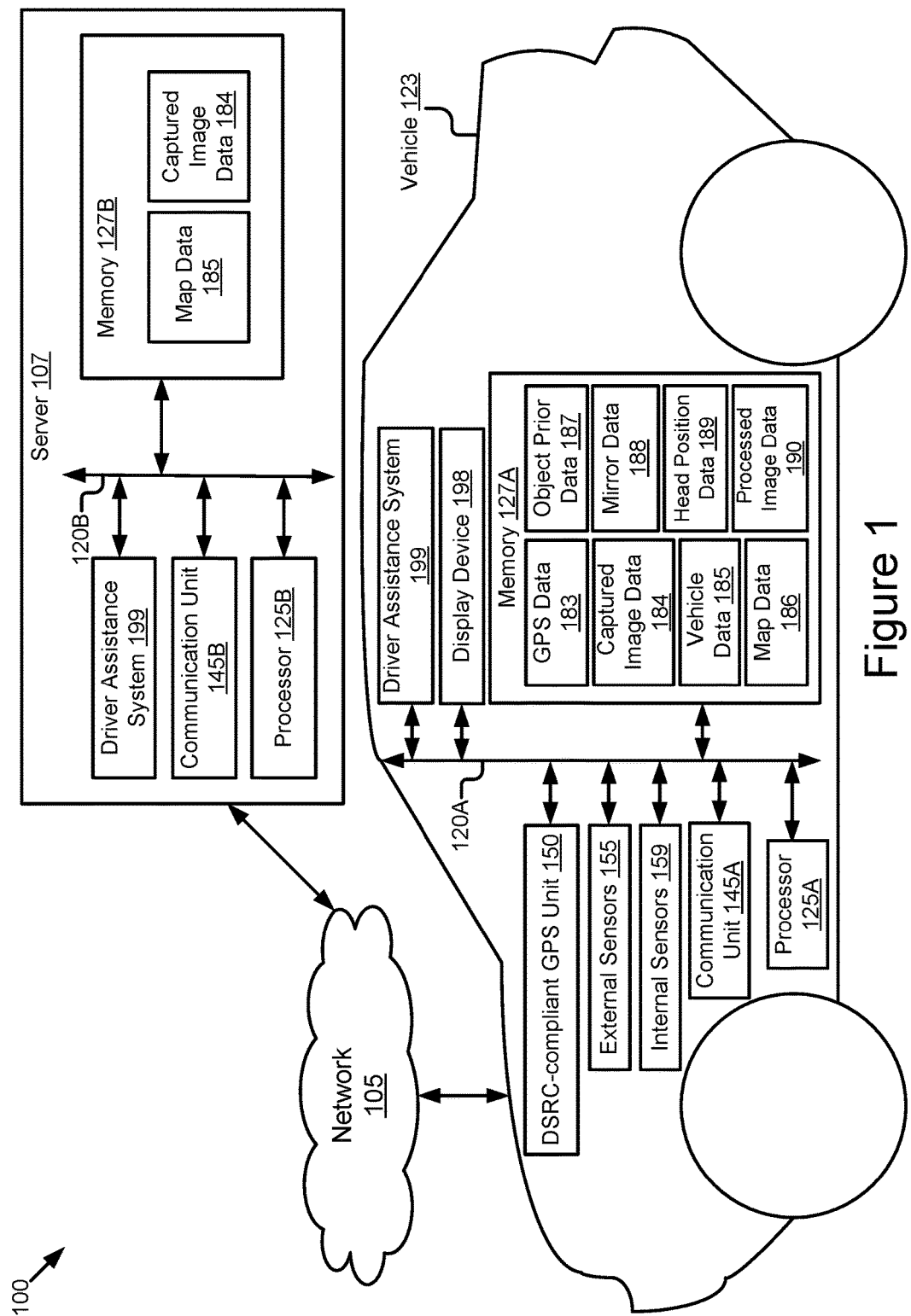
FIG. 1 is a block diagram illustrating an operating environment for a driver assistance system of a vehicle according to some embodiments.

Referring to FIG. 1, depicted is an operating environment 100 for a driver assistance system 199 of a vehicle 123 according to some embodiments. The operating environment 100 may include one or more of the vehicle 123 and a server 107. These elements may be communicatively coupled to one another via a network 105. Although one vehicle 123, one server 107, and one network 105 are depicted in FIG. 1, in practice the operating environment 100 may include one or more vehicles 123, one or more servers 107, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

In some embodiments, the vehicle 123 is a DSRC-equipped vehicle. The network 105 may include one or more communication channels shared among the vehicle 123 and the server 107. The communication channel may include DSRC, LTE vehicle to everything (V2X), full-duplex wireless communication or any other wireless communication protocol. For example, the network 105 may be used to transmit a DSRC message, a DSRC probe, a basic safety message (BSM) or a full-duplex message including any of the data described herein.

The vehicle 123 is any type of vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 may include an Advanced Driver Assistance System (herein "ADAS system"). The ADAS system may be operable provide some or all of the functionality that provides autonomous functionality.

In some embodiments, the vehicle 123 includes one or more of the following elements: a processor 125A; a memory 127A; a communication unit 145A; a DSRC-compliant GPS unit 150; external sensors 155; internal sensors 159; a display device 198; and a driver assistance system 199. These elements of the vehicle 123 are communicatively coupled to one another via a bus 120A.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server.

In some embodiments, the server 107 includes one or more of the following elements: a processor 125B; a memory 127B; a communication unit 145B; and a driver assistance system 199. These elements of the server 107 are communicatively coupled to one another via a bus 120B.

The processor 125A of the vehicle 123 and the processor 125B of the server 107 may be referred to herein collectively or individually as the "processor 125" since, for example, the processor 125A of the vehicle 123 provides similar functionality to the components of the vehicle 123 as does the processor 125B of the server 107. For similar reasons, the description provided herein uses the following terms when referring to elements that are common to the vehicle 123 and the server 107: the "memory 127" when referring to the memory 127A and the memory 127B, collectively or individually; and the "communication unit 145" when referring to the communication unit 145A and the communication unit 145B, collectively or individually.

The vehicle 123 and the server 107 are now described.

Vehicle 123

In some embodiments, the processor 125 and the memory 127 may be elements of an onboard vehicle computer system (such as computer system 200 described below with reference to FIG. 2). The onboard vehicle computer system may be operable to cause or control the operation of the driver assistance system 199. The onboard vehicle computer system may be operable to access and execute the data stored on the memory 127 to provide the functionality described herein for the driver assistance system 199 or its elements (see, e.g., FIG. 2). The onboard vehicle computer system may be operable to execute the driver assistance system 199 which causes the onboard vehicle computer system to execute one or more of the steps of the method 700 described below with reference to FIG. 7.

The DSRC-compliant GPS unit 150 may be operable to record GPS data 183 that describes one or more locations of the vehicle 123 at one or more different times. The GPS data 183 may be timestamped to indicate the time when the vehicle 123 was at this particular location. For example, the GPS data 183 may describes the location of the vehicle 123 with lane-level accuracy, thereby generating more accurate mirror data 188. The GPS data 183 is stored in the memory 127. The DSRC-compliant GPS unit 150 includes hardware to make the GPS compliant with DSRC, such as a DSRC antenna.

The external sensors 155 may include one or more sensors that are operable to describe the physical environment outside of the vehicle 123. The external sensors 155 may record one or more physical characteristics of the physical environment that is proximate to the vehicle 123. For example, the external sensors 155 may capture captured image data 184 that describes an image of a traffic mirror. The external sensors 155 may also capture an image of the traffic mirror with a particular focus on the image reflected by the traffic mirror. The captured image data 184 may include raw images, jpeg images, png images, etc. The external sensors 155 may store the captured image data 184 in the memory 127.

In some embodiments, the external sensors 155 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The internal sensors 159 are sensors inside the vehicle 123. In some embodiments, the internal sensors 159 include sensors that monitor a head position of the driver to generate head position data 189. In some embodiments, the internal sensors 159 that monitor the head position of the driver are part of a display device 198, such as embodiments where the display device 198 includes AR goggles.

In some embodiments, the internal sensors 159 include sensors that record vehicle data 185. The vehicle data 185 may include vehicle kinematic data that can be used by the driver assistance system 199 to determine whether the vehicle 123 is still moving. The internal sensors 159 may store the head position data 189 and/or the vehicle data 185 in the memory 127.

In some embodiments, the internal sensors 159 include sensors that indicate an intention of a driver of the vehicle 123 to turn in a particular direction. For example, the internal sensors 159 may include sensors associated with a turn signal that provide information to the driver assistance system 199 about whether the driver intends to turn left or right.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 may store one or more of the following elements: GPS data 183; captured image data 184; vehicle data 185; map data 186; object prior data 187; mirror data 188; head position data 189; and processed image data 190.

The GPS data 183 includes information about a current location of the vehicle 123. The GPS data 183 may be received from the DSRC-compliant GPS unit 150 and may describe the current location of the vehicle 123 with such precision that the location of the vehicle 123 within a particular lane may be identified.

The captured image data 184 may describe images captured by the external sensors 155 as described above. The captured image data 184 may describe all images captured in an attempt to identify images that include a traffic mirror. Alternatively, the captured image data 184 may determine whether an image includes a traffic mirror before storing it as captured image data 184.

The vehicle data 185 may describe information about the vehicle, such as a speed and distance of the vehicle as a function of time. The vehicle data 185 may be captured by the internal sensors 159 as described above.

The map data 186 may be digital data that is indexed by location data, such as GPS data 183. The map data 186 describes the location of traffic mirrors and the viewing angle for imaging a traffic mirror from the vehicle's 123 particular lane of travel.

The object prior data 187 describes object priors for traffic mirrors. For example, the object prior data 187 may describe the shape of reference traffic mirrors, an expected location for traffic mirrors, etc. The driver assistance system 199 may identify a location of a traffic mirror by comparing captured image data 184 to object prior data 187.

The mirror data 188 includes presence data that describes whether a traffic mirror is present at a location described by the GPS data. The mirror data 188 optionally also includes viewing angle data that describes how the external sensors 155 should be oriented in order to capture an image of the traffic mirror. The viewing angle data beneficially reduces the amount of time the external sensors 155 have to spend sweeping the roadway environment to identify where the traffic mirror is located.

The head position data 189 describes the orientation of the driver's head. The head position data 189 may be tracked while the driver is wearing AR goggles. For example, the head position data 189 may include rotation vectors with roll, pitch, and yaw coordinates. The driver assistance system 199 determines, based on the head position data 189, where the driver is looking and how to instruct AR goggles to position an overlay that includes processed image data 190. In some embodiments, the head position data 189 may be tracked independent of whether the driver is wearing AR goggles. For example, the head position data 189 may be used by the driver assistance system 199 to determine whether the driver is looking at a fixed location in the real world where a traffic mirror would be located.

The processed image data 190 describes processed images that are processed by the driver assistance system 199. For example, the driver assistance system 199 may receive an image of a traffic mirror captured by the external sensors 155, enlarge the image, undistort the image, and optically reverse the enlarged undistorted image. The enlarged, undistorted and optically reversed image may be stored as processed image data 190.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the server 107) a DSRC-enabled device.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The display device 198 is a device that displays the optically reversed version of the image described by the processed image data 190. The display device 198 includes AR goggles, a 3D-HUD, or a full-color electronic display. The display device 198 may include a non-transitory cache or buffer that temporarily stores data that it receives from the driver assistance system 199.

AR goggles may include one or more of the following: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens. The AR goggles are configured so that a driver of the vehicle 123 can be focused on the driving experience when operating the vehicle 123. The AR goggles generates head position data 189 that describes the orientation of the driver's head while the driver is wearing the AR goggles. The AR goggles may include one or more internal sensors 159 to generate the head position data 189. In some embodiments, the AR goggles may include additional equipment such as AR gloves to manipulate virtual objects displayed by the AR goggles.

Figure 6:
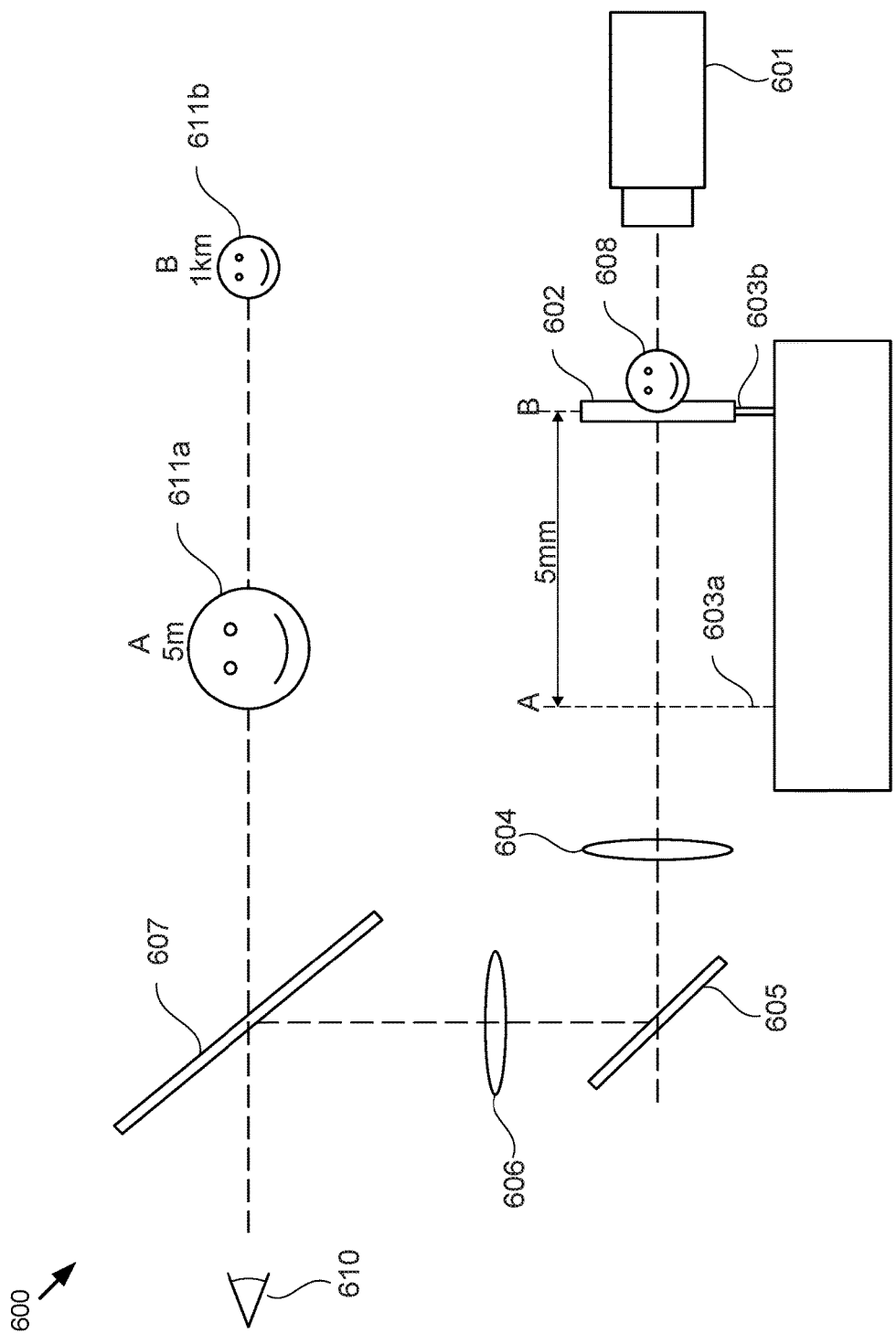
FIG. 6 is a block diagram illustrating a 3D-HUD according to some embodiments.

The 3D-HUD may be installed as a layer of a windshield of the vehicle 123. An example of the 3D-HUD is depicted in FIG. 6. For example, a driver of the vehicle 123 may view the 3D-HUD and the 3D-HUD may display the optically reversed version of the image described by the processed image data 190 provided to the vehicle 123 by the driver assistance system 199. The 3D-HUD is described in more detail below with reference to FIG. 6.

The full-color electronic display may include a laptop, a tablet, an LCD screen, etc. In some embodiments, the full-color electronic display is associated with an infotainment system.

In some embodiments, the driver assistance system 199 may include code or routines that uses the communication unit 145 of the vehicle 123 to communicate with a driver assistance system 199 stored on the server 107 via the network 105. The driver assistance system 199 on the server 107 may provide the driver assistance system 199 in the vehicle 123 with data needed for the driver assistance system 199 and the display device 198 to assist the driver. For example, the driver assistance system 199 on the server 107 may provide the driver assistance system 199 in the vehicle 123 with map data 186 and/or captured image data 184.

In some embodiments, the driver assistance system 199 of the vehicle 123 may be implemented using hardware including a field-programmable gate array ("FPGA") or an application-specific integrated circuit ("ASIC"). In some other embodiments, the driver assistance system 199 may be implemented using a combination of hardware and software. The driver assistance system 199 may be stored in a combination of the devices (e.g., servers or other devices), or in one of the devices.

The driver assistance system 199 may generate mirror data 188 using the GPS data 183 and the map data 186, orient the external sensors 155 based on the mirror data 188 to capture images of a traffic mirror, and store the images as captured image data 184 that describes the traffic mirror. The external sensors 155 may also capture an image of the traffic mirror with a particular focus on the image reflected by the traffic mirror. The captured image data 184 describes an image of the reflected image depicted in the traffic mirror. The driver assistance system 199 processes the captured image data 184 to generate processed image data 190. The processed image data 190 is configured so that the image in the traffic mirror is optically reversed. In this way the objects included in the image described by processed image data 190 appear as they would in the real world when viewed directly with human eyes instead of looking at them in a mirror. The driver assistance system 199 then causes the display device 198 to display the processed image data 190. For example, the driver assistance system 199 causes the display device 198 to display the optically reversed version of the image described by the processed image data 190. The images displayed by the display device 198 are easier to understand because they are bigger and optically reversed. The driver assistance system 199 is described in more detail below with reference to FIGS. 2, 3A, 3B, 4A, 4B, 5A, 5B, 7, and 8.

Server 107

In some embodiments, the server 107 is a cloud server that includes a driver assistance system 199, a memory 127B, a processor 125B, and a communication unit 145B. The memory 127 stores any data needed for the driver assistance system 199 and the display device 198 to provide new or different vehicle functionality to the vehicle 123 that would not otherwise be available to the driver of this particular vehicle 123. For example, the memory 127 may include map data 186 that describes the location of traffic mirrors for a geographic area. The memory 127 may also include captured image data 184 that describes images captured by cameras of the traffic mirrors. For example, the captured image data 184 may be captured by cameras on other vehicles that are near the vehicle 123 that includes the driver assistance system 199. Although the driver assistance system 199 of the vehicle 123 may be able to generate the map data 186, the driver assistance system 199 may be able to generate mirror data 188 faster if the if the driver assistance system 199 does not also have to generate the map data 186.

The following elements of the server 107 are the same or similar to those described above for the vehicle 123, and so, the descriptions of these elements will not be repeated here: the processor 125B; the memory 127B; and the communication unit 145B. The communication unit 145B handles communications between the server 107 and the vehicle 123 via the network 105.

Although not depicted in FIG. 1, in some embodiments the driver assistance system 199 may include a full-duplex coordination system as described in U.S. patent application Ser. No. 14/471,387 filed on Aug. 28, 2014 and entitled "Full-Duplex Coordination System."

Example Computer System

Figure 2:
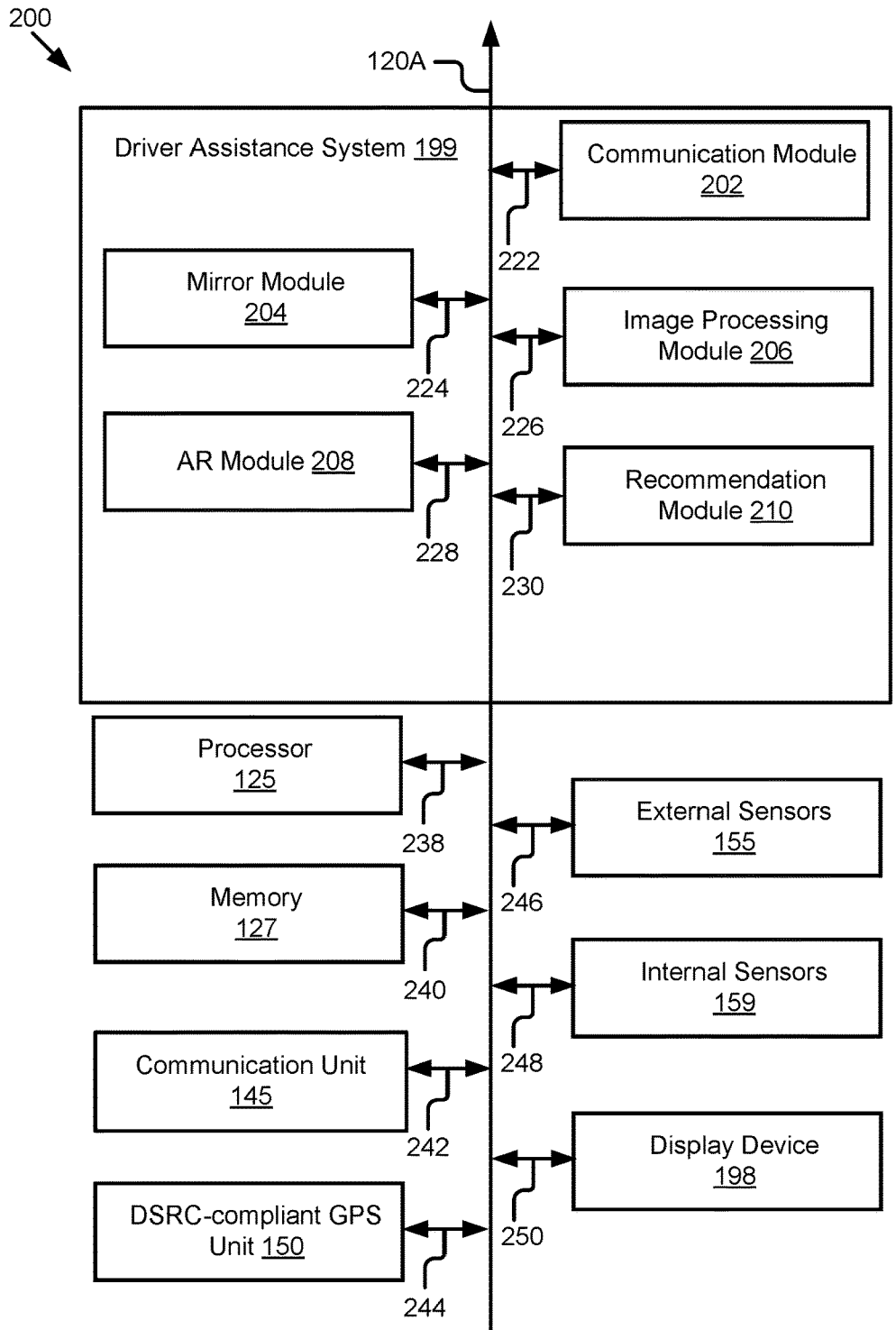
FIG. 2 is a block diagram illustrating an example computer system including the driver system of the vehicle according to some embodiments.

Referring now to FIG. 2, depicted is a block diagram illustrating an example computer system 200 including a driver assistance system 199 according to some embodiments.

In some embodiments, the computer system 200 may include a special-purpose computer system that is programmed to perform one or more steps of methods 700 and 725 described below with reference to FIGS. 7 and 8, respectively.

In some embodiments, one or more components of the computer system 200 may be part of the server 107.

In some embodiments, the computer system 200 may be an onboard vehicle computer of the vehicle 123.

In some embodiments, the computer system 200 may include an electronic control unit, head unit or some other processor-based computing device of the vehicle 123.

The computer system 200 may include one or more of the following elements according to some examples: the driver assistance system 199; the processor 125; the memory 127; the communication unit 145; the DSRC-compliant GPS unit 150; the external sensors 155; the internal sensors 159; and the display device 198. The components of the computer system 200 are communicatively coupled by a bus 120.

In the illustrated embodiment, the processor 125 is communicatively coupled to the bus 120 via a signal line 238. The memory 127 is communicatively coupled to the bus 120 via a signal line 240. The communication unit 145 is communicatively coupled to the bus 120 via a signal line 242. The DSRC-compliant GPS unit 150 is communicatively coupled to the bus 120 via a signal line 244. The external sensors 155 are communicatively coupled to the bus 120 via a signal line 246. The internal sensors 159 are communicatively coupled to the bus 120 via a signal line 248. The display device 198 is communicatively coupled to the bus 120 via a signal line 250.

The following elements of the computer system 200 were described above with reference to FIG. 1, and so, those descriptions will not be repeated here: the processor 125; the memory 127; the communication unit 145; the DSRC-compliant GPS unit 150; the external sensors 155; the internal sensors 159; and the displaying device 198.

The memory 127 may store any of the data described above with reference to FIG. 1. The memory 127 may store any data needed for the computer system 200 to provide its functionality.

In the illustrated embodiment shown in FIG. 2, the driver assistance system 199 includes a communication module 202, a mirror module 204, an image processing module 206, an AR module 208, and a recommendation module 210.

The communication module 202 can be software including routines for handling communications between the driver assistance system 199 and other components of the computer system 200. In some embodiments, the communication module 202 can be a set of instructions executable by the processor 125 to provide the functionality described below for handling communications between the driver assistance system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, one or more of the following elements: the GPS data 183; the captured image data 184; the vehicle data 185; the map data 186; the object prior data 187; the mirror data 188; the head position data 189; and the processed image data 190. The communication module 202 may send or receive any of the data or messages described above with reference to FIG. 1 or below with reference to FIGS. 7 and 8 via the communication unit 145.

In some embodiments, the communication module 202 receives data from components of the vehicle 123 and/or the driver assistance system 199 and stores the data in the memory 127 (or a buffer or cache of the display device 198). For example, the communication module 202 receives any of the data described above with reference to the memory 127 from the communication unit 145 (via the network 105) and stores this data in the memory 127 (or a buffer or cache of the display device 198). In another example, the communication module 202 receives GPS data 183 from the DSRC-compliant GPS unit 150 and stores the GPS data 183 in the memory 127.

In some embodiments, the communication module 202 may handle communications between components of the driver assistance system 199. For example, the communication module 202 may transmit processed image data 190 from the image processing module 206 to the AR module 208.

The mirror module 204 can be software including routines for generating mirror data 188. In some embodiments, the mirror module 204 can be a set of instructions executable by the processor 125 to provide the functionality described below for generating the mirror data 188. In some embodiments, the mirror module 204 can be stored in the memory 127 of the computer system 200 and can be accessible and executable by the processor 125. The mirror module 204 may be adapted for cooperation and communication with the processor 125 and other components of the computer system 200 via signal line 224.

The mirror module 204 receives GPS data 183 from the DSRC-compliant GPS unit 150. The GPS data 183 describes a current location of the vehicle 123. Because the GPS data 183 is from a DSRC-compliant device, the GPS data 183 is accurate to within plus or minus three meters. By comparison, non-DSRC-compliant GPS units are only accurate to within plus or minus 10 meters. As a result, the GPS data 183 describes a lane in which the vehicle 123 is travelling. In some embodiments, having GPS data 183 with lane-level accuracy is relevant since the real-world traffic mirrors are located at different viewing angles depending on which lane in which the vehicle 123 is travelling.

In some embodiments, the mirror module 204 generates mirror data 188 based on the GPS data 183 and map data 186. The GPS data 183 describes the current location of the vehicle 123. The map data 186 describes corresponding locations for a set of traffic mirrors in a geographic location. For example, the map data 186 may describe the corresponding locations for a set of traffic mirrors in San Jose, Calif. or zip code 94043 in Mountain View, Calif. The mirror module 204 may obtain the mirror data 188 by inputting the GPS data 183 for the current location of the vehicle 123 and the map data 186 outputs mirror data 188 that describes whether a traffic mirror is associated with the current location.

For example, where the map data 186 is indexed by the GPS data 183, the GPS data 183 may be used as a query to retrieve the mirror data 188 from the map data 186. The mirror data 188 may describe the exact location and orientation of the traffic mirror relative to other objects at that same location so that the traffic mirror is easier to locate and image using the external sensors 155.

In some embodiments, the map data 186 also includes a viewing angle for the traffic mirror in a specific lane of travel of the vehicle as described by the GPS data 183. The mirror module 204 may therefore generate mirror data 188 that the mirror module 204 uses to determine whether to instruct the external sensors 155 to scan for traffic mirrors and how to orient the external sensors 155 in order to quickly capture images of the traffic mirror. The mirror module 204 instructs, based on the mirror data 188, the external sensors 155 to capture images that include the traffic mirror. The external sensors 155 store the images as captured image data 184.

In some embodiments, the mirror module 204 generates mirror data 188 based on object priors. The mirror module 204 may receive the captured image data 184 from the external sensors 155 or the memory 127 (e.g., via the communication module 202) and object prior data 187 from the memory 127. The mirror module 204 may compare the captured image data 184 to the object prior data 187. For example, the object prior data 187 may describe the shape of reference traffic mirrors, an expected location for traffic mirrors, etc. The mirror module 204 may identify a location of a traffic mirror by comparing captured image data 184 to the object prior data 187.

The mirror module 204 may generate mirror data 188 in real time so that the mirror module 204 can instruct the external sensors 155 to capture the images quickly and with increased precision. In addition, this may increase the speed for generating the processed image data 190, which results in up-to-date displayed traffic mirror content to improve the driver's experience and increase the driver's safety.

The image processing module 206 can be software including routines for generating processed image data 190. In some embodiments, the image processing module 206 can be a set of instructions executable by the processor 125 to provide the functionality described below for generating the processed image data 190. In some embodiments, the image processing module 206 can be stored in the memory 127 of the computer system 200 and can be accessible and executable by the processor 125. The image processing module 206 may be adapted for cooperation and communication with the processor 125 and other components of the computer system 200 via signal line 226.

Figure 3A:
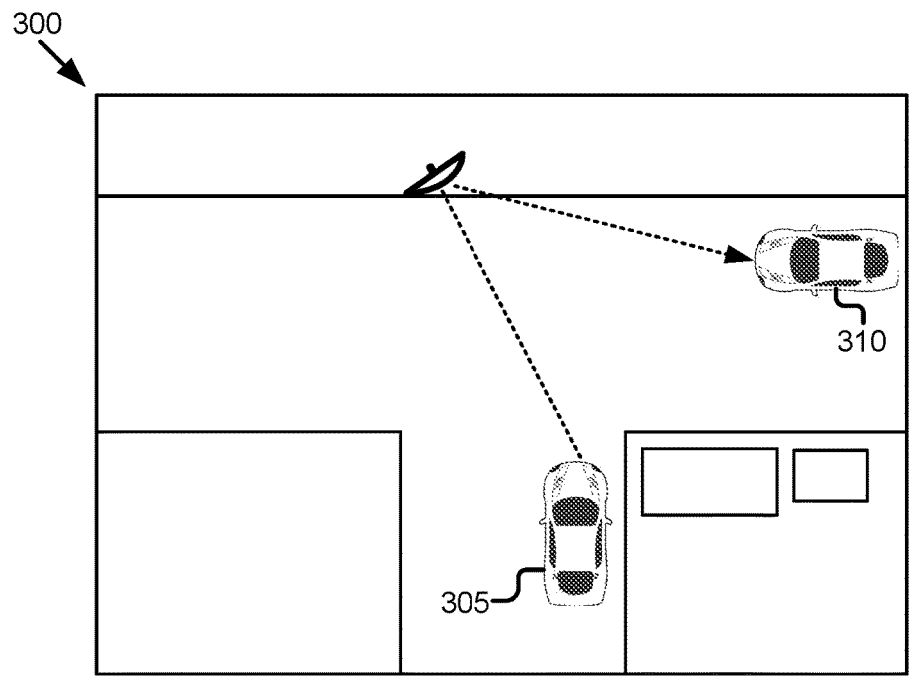
FIG. 3A includes a block diagram illustrating how a traffic mirror provides information about objects in a roadway environment according to some embodiments.
Figure 3B:
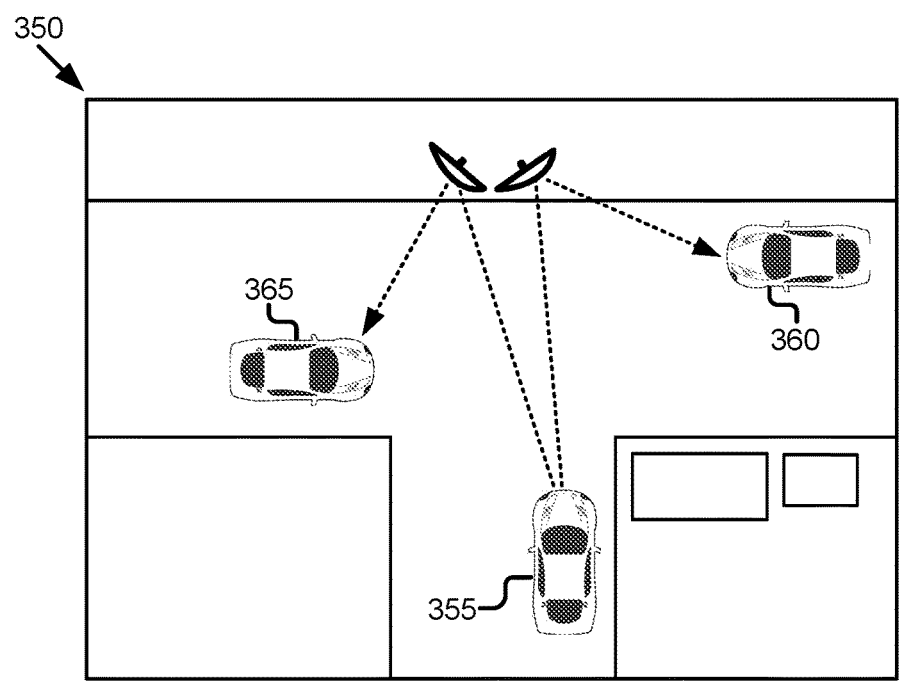
FIG. 3B includes a block diagram illustrating how multiple traffic mirrors provide information about objects in a roadway environment according to some embodiments.

Turning to FIGS. 3A and 3B, two examples of how a traffic mirror may be used to generate traffic mirror content to assist a driver are illustrated. FIG. 3A includes a block diagram 300 illustrating how a traffic mirror provides information about objects in a roadway environment. In this example, vehicle 305 includes the driver assistance system 199 with the image processing module 206. The image processing module 206 receives captured image data 184 from the external sensors 155 or the image processing module 206 retrieves the captured image data 184 from the memory 127. The image processing module 206 processes the captured image data 184 to generate processed image data 190 that makes the captured image data 184 understandable to a driver. For example, the image processing module 206 generates a processed image that optically reverses the captured image from the traffic mirror because the objects in the captured image are reversed. The image processing module 206 instructs a display device 198 to display the processed image data 190. For example, the image processing module 206 instructs the display device 198 to display the optically reversed version of the image described by the processed image data 190.

A driver can use the processed image data 190 to help make a decision about whether it is safe to drive. For example, if the driver of vehicle 305 wants to make a right turn, because there is no vehicle approaching from the left-hand side, it is safe for the driver to make a right turn. Conversely, if the driver wants to make a left turn, it is not safe because the vehicle 305 would collide with vehicle 310. As will be discussed in greater detail below, the driver assistance system 199 may include a recommendation module 210 that determines which direction the driver intents to move and the recommendation module 210 may make corresponding recommendations. Continuing with the example in FIG. 3A, the recommendation module 210 might determine that the driver wants to make a left turn and the recommendation module 210 may recommend against turning left.

FIG. 3B includes a block diagram 350 illustrating how multiple traffic mirrors provide information about objects in a roadway environment according to some embodiments. In this example, the traffic mirror content is even more complicated because there are two traffic mirrors and two other vehicles 360, 365. If the driver of the vehicle 355 tried to view the traffic mirror content from the traffic mirrors, the driver would have to identify a first car 365 coming from the left and a second car 360 coming from the right. As a result, the driver assistance system 199 can help the driver of the vehicle 355 by making the traffic mirror content more understandable.

In some embodiments, the image processing module 206 generates processed image data 190 by performing one or more of the following three processing steps in any order. First, the image processing module 206 generates an enlarged version of the image. For example, the image processing module 206 identifies a portion of an image of the traffic mirror that includes the traffic mirror content, crops the image to only include the portion of the image that includes the traffic mirror content, and enlarges the image. Second the image processing module 206 undistorts the image. For example, because the traffic mirror may have a spherical shape, the traffic mirror content may be distorted. The image processing module 206 may distort the image by making the image conform to a substantially square or substantially rectangular shape.

Third, the image processing module 206 optically reverses the image. Due to the laws of physics, the reflected image is optically reversed so that the objects depicted in the reflected image are reversed relative to how those objects would be oriented in the real world when viewed direction with human eyes instead of looking at them in a mirror. The image processing module 206 optically reverses the image so that objects included in the image appear as they would in the real world when viewed directly with human eyes instead of looking at them in a mirror.

The image processing module 206 instructs the display device 198 to display the processed image data 190. For example, the image processing module 206 instructs the display device 198 to display the optically reversed version of the image described by the processed image data 190. In some embodiments where the display device 198 includes AR goggles, the image processing module 206 transmits the processed image data 190 to the AR module 208. In some embodiments, the image processing module 206 transmits the processed image data 190 to the recommendation module 210 so that the recommendation module 210 can generate a recommendation in conjunction with displaying the processed image data 190.

Figure 4A:
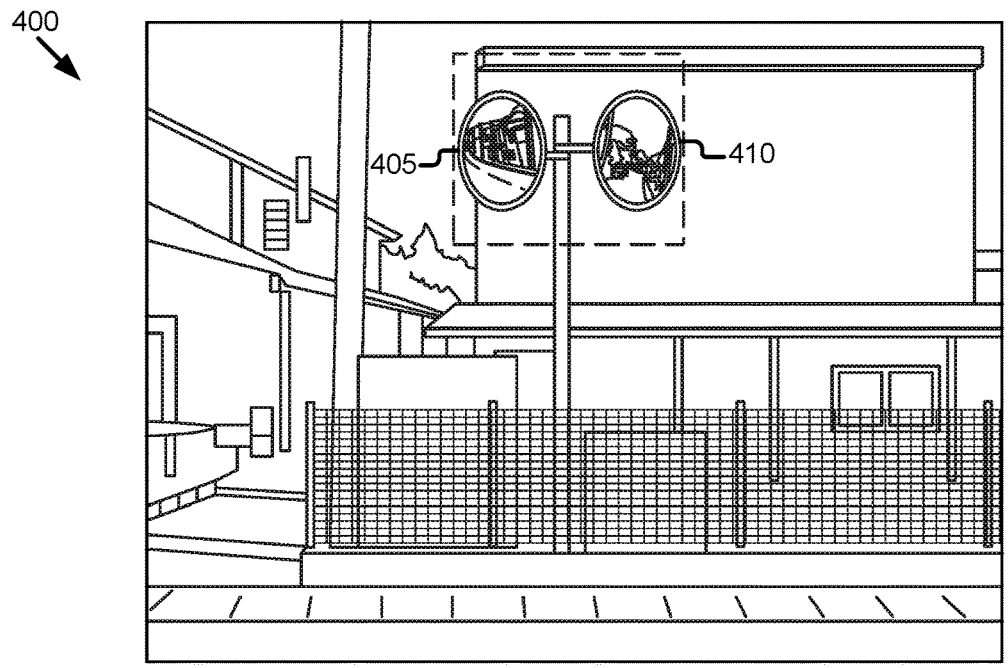
FIG. 4A is an example view of a road with traffic mirrors that include objects in a roadway environment.
Figure 4B:
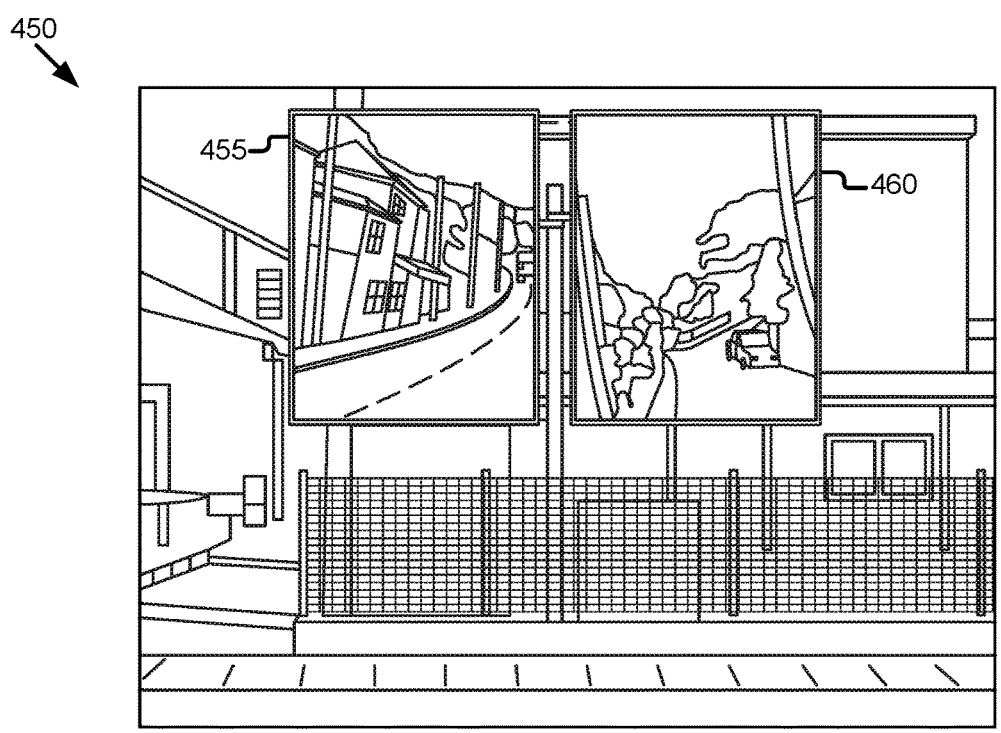
FIG. 4B is an example view of the traffic mirror content of FIG. 4A after the driver assistance system processes an image of the traffic mirror according to some embodiments.

Turning to FIGS. 4A and 4B, an example of how the traffic mirror content is processed by the image processing module 206 is illustrated. FIG. 4A is an example view 400 of a road with traffic mirrors that include objects in a roadway environment. This example illustrates how a driver would view the real-world while sitting in a vehicle. Traffic mirror 405 illustrates traffic mirror content to the left of the driver. Traffic mirror 410 illustrates traffic mirror content to the right of the driver.

FIG. 4B is a block diagram 450 of the traffic mirror content of FIG. 4A after the image processing module 206 processes an image of the traffic mirror. The traffic mirror content 455 from the left traffic mirror 405 of FIG. 4A and the traffic mirror content 460 from the right traffic mirror 410 of FIG. 4A are enlarged, un-distorted, and optically reversed.

In some embodiments, the image processing module 206 determines a location for the processed image data 190 to be displayed to the user. For example, the image processing module 206 may determine that because the display device 198 is a full-color electronic display, the screen of the full-color electronic display should include only the processed image data 190 and not content that surrounds the processed image data 190. In another example where the display device 198 includes AR goggles or a 3D-HUD, the image processing module 206 may position the processed image data 190 as a graphical overlay to show the current location of objects from the processed image data 190 on top of objects in the driver's view that obscure the processed image data 190. For example, if the traffic mirror content reveals that another vehicle is approaching the driver's vehicle 123, the image processing module 206 may instruct the 3D-HUD to display the processed image data 190 as an overlay on top of a building that obscures the driver's view of the other vehicle.

The AR module 208 can be software including routines for generating a graphical overlay depicting the processed image data 190. For example, the AR module 208 can be software including routines for generating a graphical overlay depicting the optically reversed version of the image described by the processed image data 190. In some embodiments, the AR module 208 can be a set of instructions executable by the processor 125 to provide the functionality described below for generating the graphical overlay. In some embodiments, the AR module 208 can be stored in the memory 127 of the computer system 200 and can be accessible and executable by the processor 125. The AR module 208 may be adapted for cooperation and communication with the processor 125 and other components of the computer system 200 via signal line 228.

In some embodiments, the image processing module 206 or the AR module 208 provides the processed image data 190 to the display device 198 where the display device 198 includes AR goggles. For example, the AR module 208 stores the processed image data 190 in a buffer of the AR goggles so that it can be retrieved by the AR goggles quickly when the driver's head position is oriented such that the drive should be able to see the traffic mirror content in the real world.

In some embodiments, the image processing module 206 determines whether to instruct the display device 198 to display the image described by the processed image data 190 based on whether the vehicle 123 is moving. For example, the image processing module 206 may receive vehicle data 185 from the internal sensors 159 or the memory 127 (e.g., via the communication module 202) that includes vehicle kinematic data. The image processing module 206 uses the vehicle data 185 to determine whether the vehicle 123 is moving or stationary. The image processing module 206 may instruct the display device 198 to display the processed image data 190 based on a determination that the vehicle 123 is stationary. For example, the processing module 206 may instruct the display device 198 to display the optically reversed version of the image described by the processed image data 190 based on a determination that the vehicle 123 is stationary.

In some embodiments, the image processing module 206 may periodically instruct the display device 198 update the processed image data 190 so that the processed image data 190 is displayed as a series of images that are viewable like a video. For example, the image processing module 206 may instruct the display device 198 to update the processed image data 190 every 0.1 seconds, every 0.5 seconds, every second, etc. In this way, the one or more images described by processed image data 190 accurately reflects the real-world content of the traffic mirror's reflected image.

The AR module 208 may receive head position data 189 describing a position of a head of a driver of the vehicle 123. For example, the AR module 208 may receive the head position data 189 from the internal sensors 159 or retrieve the head position data 189 from the memory 127 (e.g., via the communication module 202). The AR module 208 determines, based on the head position data 189, whether to display a graphical overlay depicting the processed image data 190 (e.g., the optically reversed version of the image described by the processed image data 190). For example, the AR module 208 may compare the head position data 189 to mirror data 188 that describes a viewing angle for a traffic mirror to determine that the traffic mirror would be viewable to the driver based on the vehicle's 123 position in a particular lane of a roadway environment.

Responsive to the AR module 208 determining to display the graphical overlay, the AR module 208 generates the graphical overlay and instructs the AR goggles to display the graphical overlay. The AR goggles display the graphical overlay with the processed image data 190 in a way that is configured so that the driver can see the real world at all times and is not disconnected from the driving experience. The graphical overlay may selectively overlay the real world.

In some embodiments, the AR module 208 may instruct the AR goggles to display the graphical overlay when the driver is looking at locations in the real world where the traffic mirror would be located. For example, when the vehicle 123 arrives at an intersection that includes a traffic mirror, the AR module 208 instructs the AR goggles to display the graphical overlay to display the processed image data 190 that is known to be present at that intersection so that the driver knows what is displayed in the traffic mirror without looking away from the intersection by looking upwards at the traffic mirror.

Figure 5A:
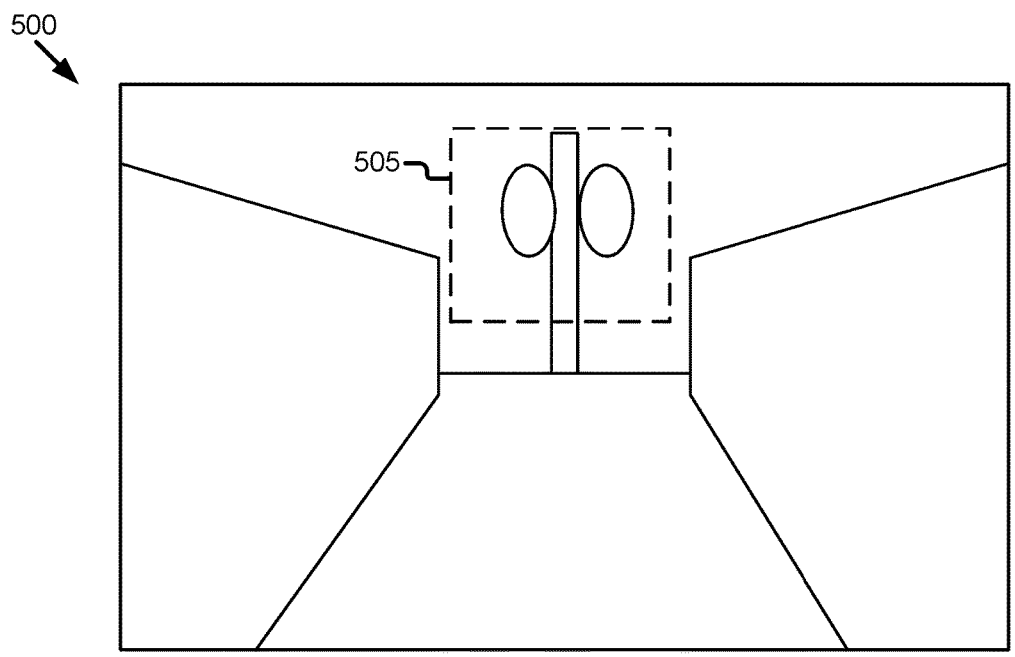
FIG. 5A is an example view of a road with traffic mirrors that include objects in a roadway environment.

FIG. 5A is an example view 500 of a road with traffic mirrors that include objects in a roadway environment. The external sensors 155 may capture an image 505 that includes the traffic mirror. The image processing module 206 may generate processed image data 190 based on the image 505.

The AR module 208 may instruct AR goggles to display a graphical overlay that includes the processed image data 190. For example, the AR module 208 may instruct AR goggles to display a graphical overlay that includes an optically reversed version of the image which is described by the processed image data 190.

Figure 5B:
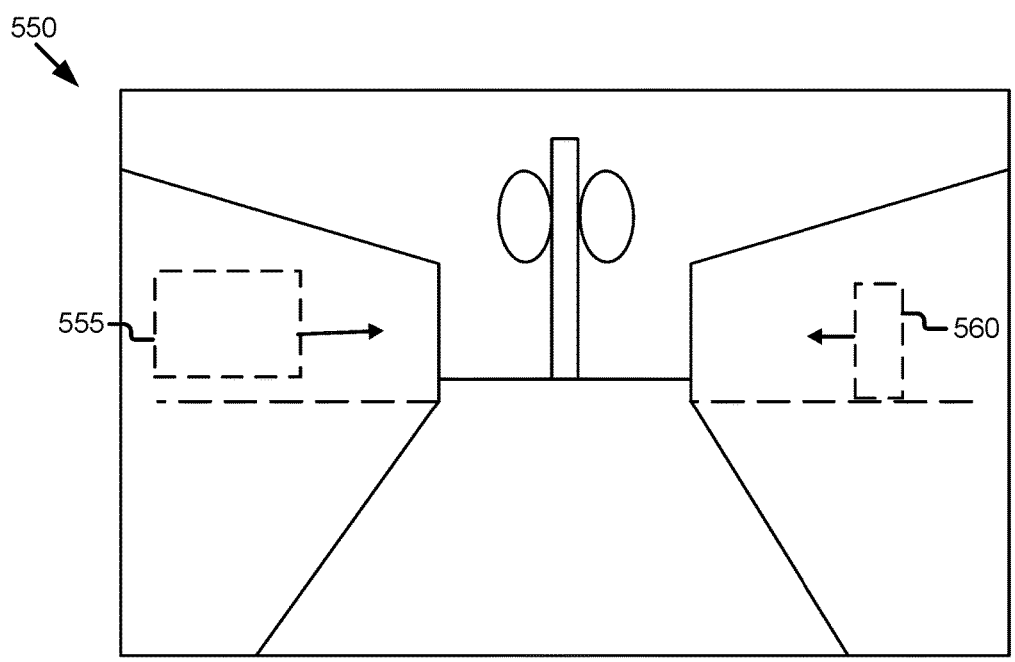
FIG. 5B is an example view of an example graphical overlay that includes an optically reversed version of the image based on the traffic mirror content of FIG. 5A.

FIG. 5B is an example view 550 of an example graphical overlay that includes processed image data 190 based on the traffic mirror content of FIG. 5A. In this example, the AR module 208 generates a graphical overlay based on the processed image data 190 that identifies a location of the traffic mirror content. For example, the image 505 in FIG. 5A may include another vehicle 555 approaching from the left and a pedestrian 560 approaching from the right. The AR module 208 generates a graphical overlay that displays the other vehicle 555 on top of a building that obscures the driver's view. The graphical overlay also displays the pedestrian 560 on top of another building that obscures the driver's view. In addition, the graphical overlay includes arrows emanating from the other vehicle 555 and the pedestrian 560, respectively, to indicate the direction that the other vehicle 555 and the pedestrian 560 are moving. This way, the driver is alerted that it may be difficult to take a left turn because of the other vehicle 555. Similarly, if the driver takes a right turn, the driver knows to watch out for the pedestrian who might try to cross in front of the vehicle 123.

The recommendation module 210 can be software including routines for generating a recommendation. In some embodiments, the recommendation module 210 can be a set of instructions executable by the processor 125 to provide the functionality described below for generating the recommendation. In some embodiments, the recommendation module 210 can be stored in the memory 127 of the computer system 200 and can be accessible and executable by the processor 125. The recommendation module 210 may be adapted for cooperation and communication with the processor 125 and other components of the computer system 200 via signal line 230.

In some embodiments, the recommendation module 210 determines an intention of a driver of the vehicle 123 to turn in a particular direction. For example, the recommendation module 210 receives vehicle data 185 from the internal sensors 159 or the memory 127 (e.g., via the communication module 202) about whether the driver has initiated a turn signal and if so, which direction for the turn signal. The recommendation module 210 estimates whether it is safe for the driver to turn in the particular direction. For example, the recommendation module 210 determines that the driver is going to turn left and, based on the processed image data 190, the recommendation module 210 determines that there is an incoming vehicle that could potentially collide with the other vehicle.

The recommendation module 210 instructs the display device 198 to provide a recommendation for whether it is safe for the driver to turn in the particular direction. For example, the recommendation module 210 determines that it is not safe to turn left because of an incoming vehicle and the recommendation module 210 instructs the display device 198 to display a warning that states: "Warning: do not turn!" In some embodiments, the recommendation module 210 highlights the processed image data 190 as a way to provide the recommendation. For example, the recommendation module 210 instructs the display device 198 to display a red box around objects that are a safety risk to the user. If the recommendation module 210 determines that it is safe to turn in the particular direction, the recommendation module 210 may instruct the display device 198 to state that it is safe to turn by, for example, providing a safe icon, words indicating it is safe to turn, or green boxes around objects that are not a safety risk to the user.

Distinguishing Augmented Reality from Virtual Reality

AR and virtual reality ("VR") are not the same thing. In VR, a user is wearing a set of VR goggles, which does not allow the user to see the outside world and a pair of headphones that provide audio that correspond to the images displayed by the VR goggles. The idea is to immerse the user in the VR world so that the user forgets about the real-world entirely.

VR is not suitable for deployment in vehicles since it distracts the driver from the roadway, and so, it is a safety hazard. Our invention does not involve VR for this reason.

In AR, the user is wearing a pair of transparent AR goggles (or glasses or a transparent HUD) that allow the user to completely see the real world. The AR goggles display graphical overlays which enhance the way the real world looks. The graphical overlay may visually appear transparent, translucent, opaque, or solid. The graphical overlay enhances or modifies the way the real-world looks when viewed through the AR goggles. The user may also be wearing an AR glove that enhances the way the real world feels. As a result, AR adds experiences to the real world without causing the user to forget about the real world.

Example 3D-HUD

Referring to FIG. 6, depicted is a block diagram illustrating a display device 198 in embodiments where the display device 198 is a 3D-HUD.

In some embodiments, the 3D-HUD includes a projector 601, a movable screen 602, a screen-driving unit 603, an optical system (including lenses 604, 606, a reflector 605, etc.). The projector 601 may be any kind of projector such as a digital mirror device (DMD) project, a liquid crystal projector. The projector 601 projects an image (graphic) 608 on the movable screen 602. The image 608 may include a graphical overlay. For example, the image 608 may be processed image data 190 as described above with reference to FIG. 2.

The movable screen 602 includes a transparent plate and so the light of the projected image transmits through the movable screen 602 to be projected on the windshield 607 of a vehicle (e.g., the vehicle 123). The image projected on the windshield 607 is perceived by a driver 610 as if it is a real object (shown as 611a, 611b) that exists in the three-dimensional space of the real-world, as opposed to an object that is projected on the windshield.

In some embodiments, the 3D-HUD is capable of controlling the direction of the image relative to the driver 610 (in other words, the image position in the windshield) by adjusting the projection position on the screen 602. Further the screen 602 is movable by the screen-driving unit 603 in the range between the positions 603a and 603b. Adjusting the position of the screen 602 can vary the depth (distance) of the projected image from the driver 610 in the real-world. In one example, the movable range of the screen 602 (distance between positions 603a and 603b) may be 5 mm, which correspond to from 5 m away to infinity in the real-world. The use of the 3D-HUD allows the driver 610 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D-HUD depicted in FIG. 6 is provided by way of example. Other examples are possible. These examples may include heads-up displays having more or less complexity than the 3D-HUD depicted in FIG. 6. For example, it is anticipated that in the future there will be heads-up displays that do not require movable parts such as the movable screen 602. For example, a static screen that does not move may be deployed. The heads-up display deployed may not be a two-dimensional heads-up display unit. In some embodiments, the driver assistance system 199 and the graphical overlay is designed to be operable with such components.

Example Methods

Figure 7:
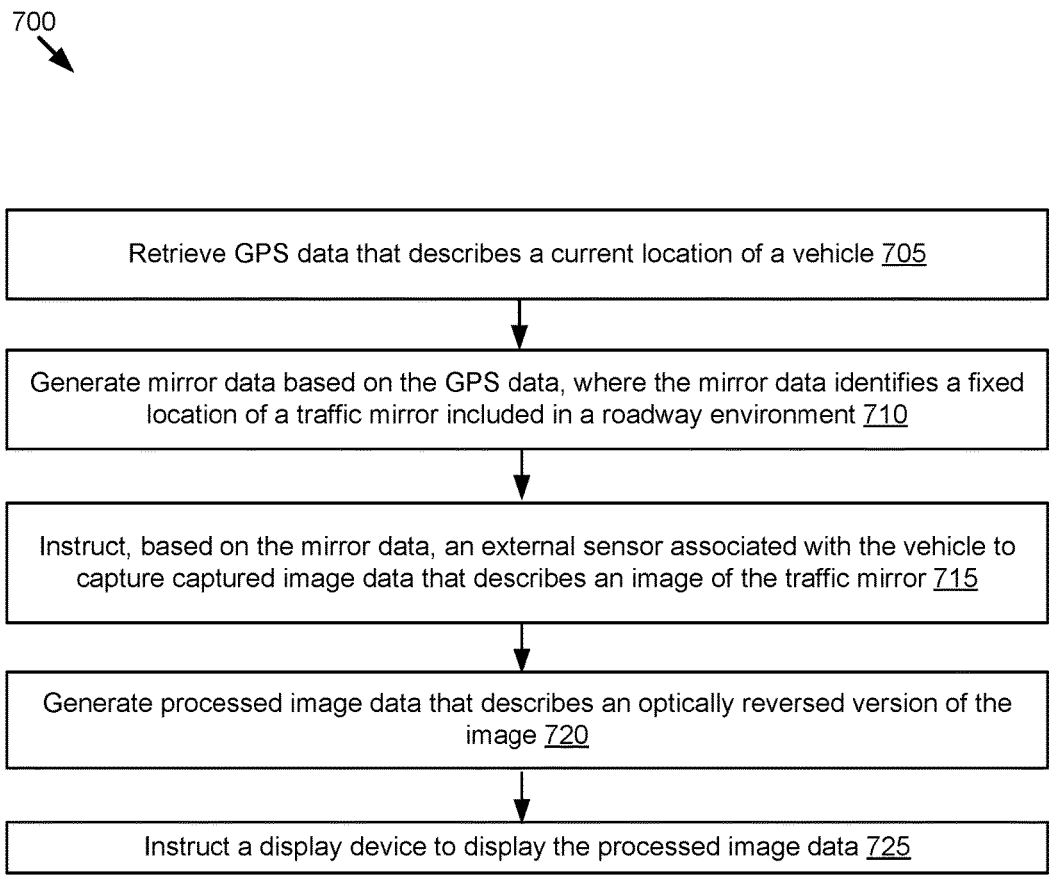
FIG. 7 is an example flow diagram of a method for generating traffic mirror content for a driver of a vehicle according to some embodiments.

Referring now to FIG. 7, depicted is a flowchart of an example method 700 for providing new or different vehicle functionality to a vehicle using a driver assistance system 199 according to some embodiments. The vehicle functionality may be provided by components of the vehicle 123 described above with reference to FIG. 1.

One or more of the steps described herein for the method 700 may be executed by one or more computer systems 200.

Referring now to FIG. 7. At step 705, GPS data 183 is retrieved that describes a current location of a vehicle. The GPS data 183 may be received from a DSRC-compliant GPS unit 150 and may describe a location of the vehicle 123 within a lane with plus or minus three meters of accuracy.

At step 710, mirror data 188 is generated based on the GPS data 183 where the mirror data identifies a fixed location of a traffic mirror included in a roadway environment. For example, the GPS data 183 may be used to obtain the mirror data 188 from map data 186 that describes the location of traffic mirrors in a geographic location.

At step 715, based on the mirror data 188, an external sensor 155 associated with the vehicle 123 is instructed to capture captured image data 184 that describes an image of the traffic mirror.

At step 720, processed image data 190 is generated that describes an optically reversed version of the image. In some embodiments, the image may be enlarged, undistorted, and optically reversed.

At step 725, a display device 198 is instructed to display the processed image data 190. For example, the display device 198 may be a full-color electronic display, a 3D-HUD, or AR goggles. The display device 198 may display an optically reversed version of the image that is described by the processed image data 190.

Figure 8:
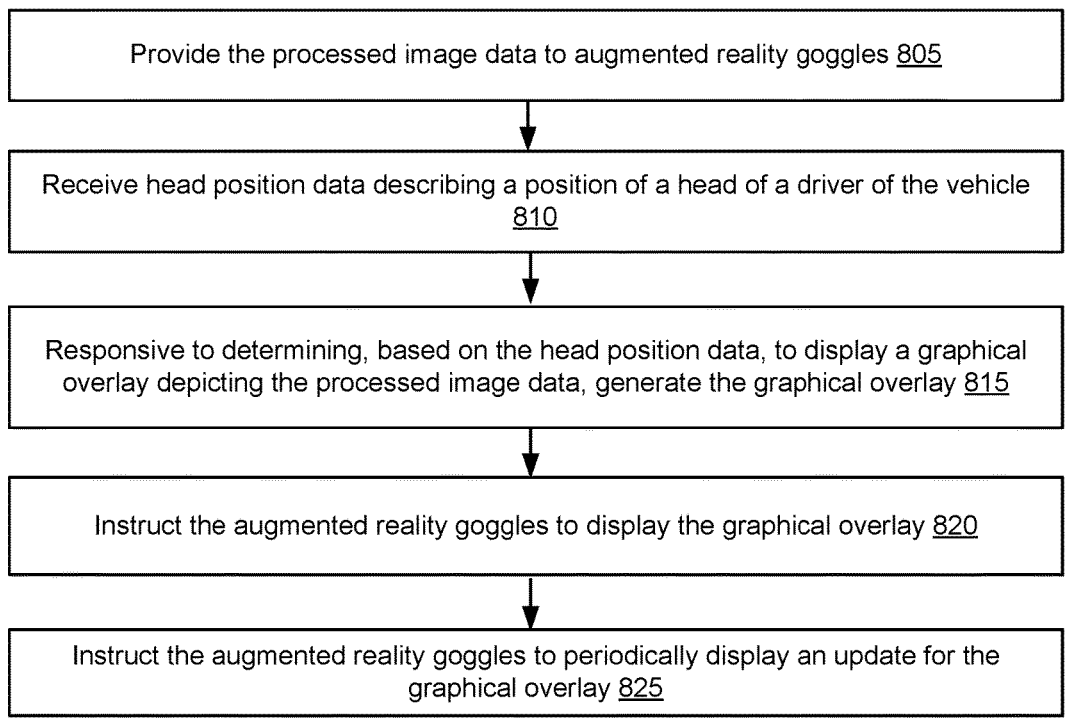
FIG. 8 is an example flow diagram of a method for instructing augmented reality goggles to display an optically reversed version of an image according to some embodiments.

Referring now to FIG. 8, depicted is a flowchart of an example method 725 for instructing AR goggles to display an optically reversed version of the image which is described by the processed image data 190 according to some embodiments. The vehicle functionality may be provided by components of the vehicle 123 described above with reference to FIG. 1.

At step 805, the processed image data 190 is provided to AR goggles. At step 810, head position data 189 describing a position of a head of a driver of the vehicle 123 is received. For example, the head position data 189 describes an angle of the driver's head while the driver is using the AR goggles.

At step 815, responsive to determining, based on the head position data 189, to display a graphical overlay depicting the processed image data 190, the graphical overlay is generated. The graphical overlay includes, for example, objects from the image of the traffic mirror that have been enlarged, undistorted, and optically reversed. At step 820, the AR goggles are instructed to display the graphical overlay. For example, the graphical overlay is positioned with the objects from the image of the traffic mirror in the position they would be in if not obscured by objects in the real world. At step 825, the AR goggles are instructed to periodically display an update for the graphical overlay.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   generating mirror data based on global positioning system (GPS) data, wherein the mirror data identifies a fixed location of a traffic mirror included in a roadway environment and the GPS data describes a current location of a vehicle included in the roadway environment;
   instructing, based on the mirror data, an external sensor associated with the vehicle to capture captured image data that describes an image of the traffic mirror;
   generating processed image data that describes an optically reversed version of the image; and
   instructing a display device included in the vehicle to display the optically reversed version of the image, wherein the display device comprises augmented reality goggles and the augmented reality goggles display the optically reversed version of the image by:
      providing the processed image data to the augmented reality goggles;
      receiving head position data describing a position of a head of a driver of the vehicle;
      responsive to determining, based on the head position data, to display a graphical overlay depicting the optically reversed version of the image, generating the graphical overlay;
      instructing the augmented reality goggles to display the graphical overlay; and
      instructing the augmented reality goggles to periodically display an update for the graphical overlay.

2. The method of claim 1, wherein the vehicle further includes augmented reality gloves to manipulate virtual objects displayed by the augmented reality goggles.

3. The method of claim 1, wherein responsive to determining to display the graphical overlay is further based on a determination that the driver is looking at the fixed location in a real world where the traffic mirror would be located.

4. The method of claim 1, wherein instructing the display device to display the optically reversed version of the image occurs responsive to a determination based on analyzing vehicle data that the vehicle is stationary.

5. The method of claim 1, further comprising:
   determining an intention of a driver of the vehicle to turn in a particular direction;
   estimating whether it is safe for the driver to turn in the particular direction; and
   wherein instructing the display device to display the optically reversed version of the image includes instructing the display device to provide a recommendation for whether it is safe for the driver to turn in the particular direction.

6. The method of claim 1, wherein:
   the display device further comprises a three-dimensional heads-up display (3D HUD); and
   instructing the display device to display the optically reversed version of the image further includes displaying the processed image data on the 3D HUD.

7. The method of claim 1, wherein the processed image data further describes one or more of an enlarged version of the optically reversed version of the image and a non-distorted version of the optically reversed version of the image.

8. The method of claim 1, wherein instructing the external sensor to capture the image of the traffic mirror based on the mirror data further includes:
   receiving captured image data from the external sensor;
   comparing the captured image data to object priors; and
   identifying the traffic mirror based on comparing the captured image data to object priors.

9. The method of claim 1, wherein the display device comprises a full-color electronic display.

10. The method of claim 1, wherein the GPS data is received from a DSRC-complaint GPS unit that is part of the vehicle.

11. The method of claim 1, wherein generating the mirror data based on the GPS data includes:
    receiving map data that describes corresponding locations for a set of traffic mirrors in a geographic location; and
    identifying the fixed location of the traffic mirror by comparing the current location of the vehicle to the map data.

12. A system comprising:
    an onboard vehicle computer system including a non-transitory memory storing computer code which, when executed by the onboard vehicle computer system causes the onboard vehicle computer system to:
       retrieve global positioning system (GPS) data that describes a current location of a vehicle;
       generate mirror data based on the GPS data, wherein the mirror data identifies a fixed location of a traffic mirror included in a roadway environment;
       instruct, based on the mirror data, an external sensor associated with the vehicle to capture captured image data that describes an image of the traffic mirror;
       generate processed image data that describes an optically reversed version of the image; and
       instruct a display device to display the optically reversed version of the image by providing the processed image data to the display device, wherein the display device includes augmented reality goggles;
       receive head position data describing a position of a head of a driver of the vehicle;
       responsive to determining, based on the head position data, to display a graphical overlay depicting the optically reversed version of the image, generate the graphical overlay;
       instruct the augmented reality goggles to display the graphical overlay; and
       instruct the augmented reality goggles to periodically display an update for the graphical overlay; and
    the display device coupled to the onboard vehicle computer system, the display device operable to receive the processed image data and display the optically reversed version of the image.

13. The system of claim 12, wherein the system further comprises augmented reality gloves to manipulate virtual objects displayed by the augmented reality goggles.

14. The system of claim 12, wherein responsive to determining to display the graphical overlay is further based on a determination that the driver is looking at the fixed location in a real world where the traffic mirror would be located.

15. A computer program product comprising a non-transitory memory of an onboard vehicle computer system of a vehicle storing computer-executable code that, when executed by the onboard vehicle computer system, causes the onboard vehicle computer system to:
  retrieve global positioning system (GPS) data that describes a current location of a vehicle;
  generate mirror data based on the GPS data, wherein the mirror data identifies a fixed location of a traffic mirror included in a roadway environment;
  instruct, based on the mirror data, an external sensor associated with the vehicle to capture captured image data that describes an image of the traffic mirror;
  generate processed image data that describes an optically reversed version of the image; and
  instruct a display device to display the optically reversed version of the image, wherein the display device comprises augmented reality goggles and the augmented reality goggles display the optically reversed version of the image by:
    providing the processed image data to the augmented reality goggles;
    receiving head position data describing a position of a head of a driver of the vehicle;
    responsive to determining, based on the head position data, to display a graphical overlay depicting the optically reversed version of the image, generating the graphical overlay;
    instructing the augmented reality goggles to display the graphical overlay; and
    instructing the augmented reality goggles to periodically display an update for the graphical overlay.

16. The computer program product of claim 15, wherein the vehicle further includes augmented reality gloves to manipulate virtual objects displayed by the augmented reality goggles.

17. The computer program product of claim 15, wherein responsive to determining to display the graphical overlay is further based on a determination that the driver is looking at the fixed location in a real world where the traffic mirror would be located.

18. The computer program product of claim 15, wherein instructing the display device to display the optically reversed version of the image occurs responsive to a determination based on analyzing vehicle data that the vehicle is stationary.

19. The computer program product of claim 15, wherein the computer-executable code causes the onboard vehicle computer system to:
  determine an intention of a driver of the vehicle to turn in a particular direction;
  estimate whether it is safe for the driver to turn in the particular direction; and
  wherein instructing the display device to display the optically reversed version of the image includes instructing the display device to provide a recommendation for whether it is safe for the driver to turn in the particular direction.

20. The computer program product of claim 15, wherein:
  the display device further comprises a three-dimensional heads-up display (3D HUD); and
  instructing the display device to display the optically reversed version of the image includes displaying the optically reversed version of the image on the 3D HUD.

* * * * *